United States Patent
Qi

(10) Patent No.: US 10,514,676 B2
(45) Date of Patent: Dec. 24, 2019

(54) THERMAL DISPLACEMENT CORRECTION APPARATUS FOR MACHINE TOOL

(71) Applicant: FANUC Corporation, Yamanashi (JP)

(72) Inventor: Xiaoguang Qi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 107 days.

(21) Appl. No.: 15/210,893

(22) Filed: Jul. 15, 2016

(65) Prior Publication Data

US 2017/0017227 A1    Jan. 19, 2017

(30) Foreign Application Priority Data

Jul. 17, 2015   (JP) .................... 2015-143307

(51) Int. Cl.
*G05B 19/404* (2006.01)

(52) U.S. Cl.
CPC .. *G05B 19/404* (2013.01); *G05B 2219/37436* (2013.01); *G05B 2219/49206* (2013.01)

(58) Field of Classification Search
CPC ........ G05B 19/404; G05B 2219/49207; G05B 2219/49219; G05B 2219/49206;
(Continued)

(56) References Cited

U.S. PATENT DOCUMENTS 5,581,467 A * 12/1996 Yasuda ................ G05B 19/404
                                                    700/193
5,623,857 A    4/1997 Sakuraba
(Continued)

FOREIGN PATENT DOCUMENTS

CN       1126130 A       7/1996
CN     103176424 A       6/2013
(Continued)

OTHER PUBLICATIONS

Office Action in JP Application No. 2015-143307, dated Aug. 29, 2017, 6 pp.
(Continued)

*Primary Examiner* — Darrin D Dunn
(74) *Attorney, Agent, or Firm* — Hauptman Ham, LLP

(57) ABSTRACT

There is provided a thermal displacement correction apparatus for a machine tool which automatically determines necessity/unnecessity of actual measurement of the machine tool, the apparatus including: a thermal displacement correction unit that predicts a thermal displacement amount from an operation of a machine or a temperature of each portion of the machine and calculates a thermal displacement correction amount for correcting thermal displacement by adding, to a position command value of a feed axis, the thermal displacement correction amount for cancelling the thermal displacement amount thus predicted; and a thermal displacement correction amount adjustment unit that calculates an adjustment value for adjusting the thermal displacement correction amount on the basis of the thermal displacement correction amount, wherein a change amount ΔE from the start of processing is obtained, ΔE is compared with designated Em, and when ΔE≥Em, actual measurement is performed with measurement means.

5 Claims, 8 Drawing Sheets

(58) Field of Classification Search
CPC .......... G05B 2219/37436; B23Q 15/18; B23Q 11/0003; B23Q 15/20; B23Q 17/22; G01M 99/002; G01N 25/16

See application file for complete search history.

(56) References Cited

U.S. PATENT DOCUMENTS

| | | | | |
|---|---|---|---|---|
| 5,895,181 | A * | 4/1999 | Ito | B23Q 11/0003 409/132 |
| 6,456,896 | B1 * | 9/2002 | Ito | G05B 19/404 700/174 |
| 6,471,451 | B2 * | 10/2002 | Kojima | G05B 19/404 318/471 |
| 7,245,983 | B2 * | 7/2007 | Suzuki | G05B 19/404 700/174 |
| 7,778,725 | B2 * | 8/2010 | Senda | B23Q 11/0007 374/55 |
| 8,423,171 | B2 * | 4/2013 | Sato | B23Q 11/0003 33/636 |
| 9,811,073 | B2 * | 11/2017 | Nishimura | G05B 19/404 |
| 2002/0004688 | A1 * | 1/2002 | Kojima | G05B 19/404 700/193 |
| 2007/0082629 | A1 * | 4/2007 | Shimizu | H03G 3/3052 455/127.2 |
| 2008/0215178 | A1 * | 9/2008 | Senda | B23Q 11/0007 700/175 |
| 2012/0123586 | A1 * | 5/2012 | Maekawa | G05B 19/404 700/173 |
| 2013/0166044 | A1 | 6/2013 | Hon | |
| 2013/0170417 | A1 | 7/2013 | Thomas et al. | |
| 2013/0190921 | A1 * | 7/2013 | Maekawa | B23Q 11/0007 700/177 |
| 2013/0325164 | A1 * | 12/2013 | Wwatanabe | B23H 7/18 700/180 |
| 2014/0074299 | A1 * | 3/2014 | Endou | G05B 13/02 700/275 |
| 2014/0192341 | A1 * | 7/2014 | Knickerbocker | G01B 11/272 356/36 |
| 2014/0379117 | A1 * | 12/2014 | Nishimura | G05B 19/404 700/173 |
| 2015/0276633 | A1 * | 10/2015 | Koyama | G01M 99/002 702/94 |
| 2016/0124420 | A1 * | 5/2016 | Murahashi | B23Q 11/0007 700/175 |
| 2016/0224010 | A1 * | 8/2016 | Qi | G05B 19/404 |
| 2017/0017227 | A1 * | 1/2017 | Qi | G05B 19/404 |

FOREIGN PATENT DOCUMENTS

| | | | | |
|---|---|---|---|---|
| EP | 1128156 A1 * | 8/2001 | ......... | B23Q 11/0007 |
| JP | 11-90779 A | 4/1999 | | |
| JP | 11-114775 A | 4/1999 | | |
| JP | 2006212765 A * | 8/2006 | ......... | B23Q 11/0007 |
| JP | 2012-101330 A | 5/2012 | | |
| JP | 2013-146823 A | 8/2013 | | |

OTHER PUBLICATIONS

Office Action in CN Application 201610560433.1, dated Aug. 1, 2018, 14pp.

Office Action in CN Application No. 201610560433.1, dated Jan. 25, 2019, 17pp.

* cited by examiner

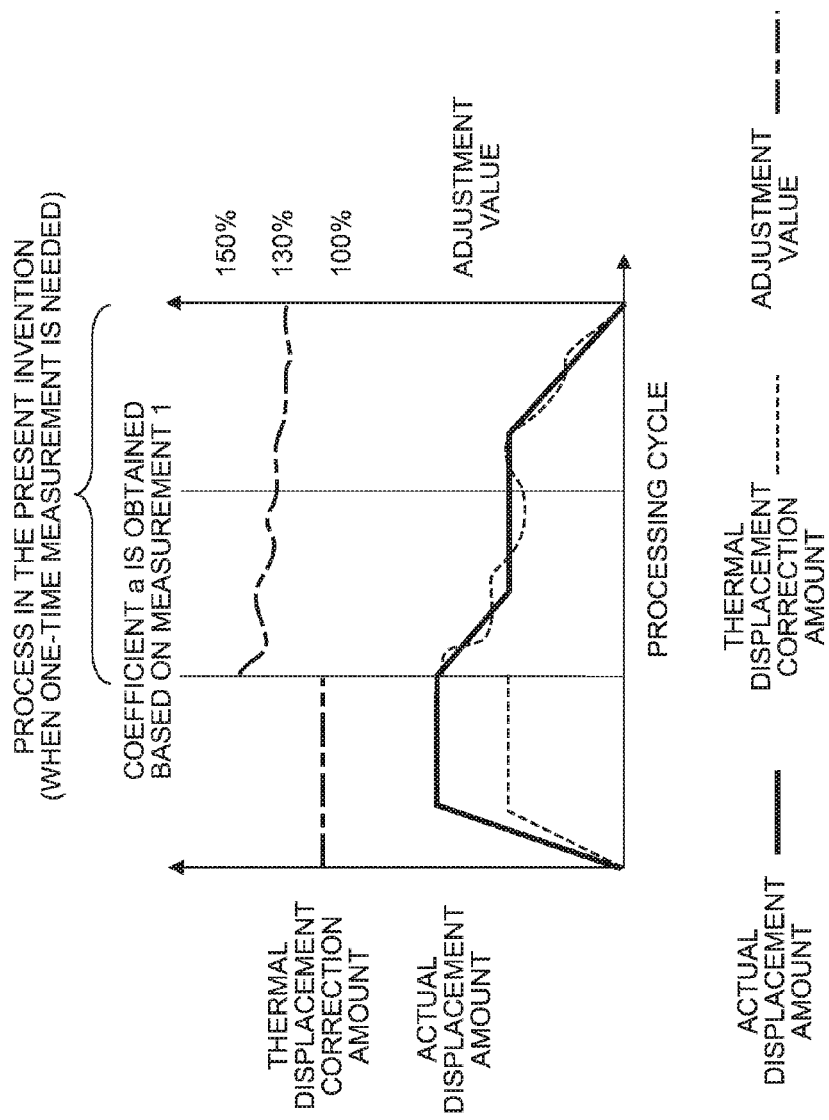

FLOWCHART OF ADJUSTMENT

THERMAL DISPLACEMENT CORRECTION APPARATUS FOR MACHINE TOOL

RELATED APPLICATIONS

The present application claims priority to Japanese Patent Application Number 2015-143307 filed Jul. 17, 2015, the disclosure of which is hereby incorporated by reference herein in its entirety.

BACKGROUND OF THE INVENTION

1. Field of the Invention

The present invention relates to a thermal displacement correction apparatus for a machine tool, and particularly, relates to a thermal displacement correction apparatus for a machine tool which automatically determines necessity/unnecessity of actual measurement of thermal displacement at each portion of the machine tool.

2. Description of the Related Art

A machine tool has a correction function with which a thermal displacement amount is calculated and corrected from an operation thereof, temperatures of portions thereof, and the like. In the correction function, there can be a case where the thermal displacement amount cannot be correctly calculated, which causes a large difference (correction error) between a thermal displacement correction amount for correcting the calculated thermal displacement amount and an actual thermal displacement amount and leads to incorrect correction. In such a case, an actual displacement amount of each portion of the machine tool is typically measured with use of a measurement device and is compared with the thermal displacement correction amount. With this comparison information, a calculation unit of the thermal displacement correction amount is controlled so as to reduce the correction error to modify the thermal displacement correction amount, and thereby, correction precision of the thermal displacement is improved.

As an example of an adjustment method of the thermal displacement correction amount in the conventional art, Japanese Patent Laid-Open No. 11-90779 discloses a method of modifying and adjusting the thermal displacement correction amount by using a measurement device in processing, measuring an actual displacement amount of each portion of the machine tool, and adding or subtracting, to/from the calculated thermal displacement correction amount, an adjustment value obtained by the comparison with the thermal displacement correction amount.

Moreover, when the actual displacement amount is measured with use of a measurement device, it is needed for measurement time (actual measurement timing) to be configured beforehand. Japanese Patent Laid-Open No. 11-114775 discloses a method of automatically determining necessity/unnecessity of actual measurement using information of a processing program, previous measurement time and the like. Moreover, the adjustment value is calculated and automatically changed by performing the actual measurement.

However, depending on a machine property and a processing environment, in the method of performing measurement at the preset measurement time and the method of performing measurement based on information of a processing program, previous measurement time and the like, there can be a case where the correction error cannot be grasped based on the adjustment value and necessity/unnecessity of actual measurement of thermal displacement at each portion of the machine tool cannot be properly determined. Therefore, in the conventional method, it is needed for the measurement time to be predetermined for measuring the actual thermal displacement, and the measurement time is needed to be changed for each processing program. Moreover, depending on the machine property and the processing environment in processing, there can be a case where necessity/unnecessity of the measurement cannot be properly determined.

SUMMARY OF THE INVENTION

Therefore, in view of the aforementioned problem of the conventional art, an object of the present invention is to provide a thermal displacement correction apparatus which automatically determines necessity/unnecessity of actual measurement of displacement at each portion of a machine tool.

There is provided a thermal displacement correction apparatus for a machine tool according to the present invention, including: a thermal displacement correction unit that predicts a thermal displacement amount from an operation of a machine or a temperature of each portion of the machine and calculates a thermal displacement correction amount for correcting thermal displacement by adding, to a position command value of a feed axis, the thermal displacement correction amount for cancelling the thermal displacement amount thus predicted; and a thermal displacement correction amount adjustment unit that calculates an adjustment value for adjusting the thermal displacement correction amount on the basis of the thermal displacement correction amount, the apparatus further including: measurement means that measures an actual dimension of a workpiece of the machine tool; determination means that determines necessity/unnecessity of performance of measurement with the measurement means on the basis of a changing situation of the adjustment value; and a measurement performance unit that performs the measurement of the actual dimension of the workpiece with the measurement means when the determination means determines that the measurement is needed.

The determination means may determine that the measurement is needed when a difference between a maximum value and a minimum value of the adjustment value within a predetermined sample time at a designated time interval exceeds a standard value. Moreover, the determination means may store a reference value in the machine beforehand, and may determine that the measurement is needed when a difference between the adjustment value at designated time and the preset reference value exceeds a standard value.

According to the present invention, there can be provided a thermal displacement correction apparatus which automatically determines necessity/unnecessity of actual measurement of a machine tool.

BRIEF DESCRIPTION OF THE DRAWINGS

The aforementioned and other objects and features of the present invention will be apparent from the following description of embodiments with reference to the appended drawings in which:

FIG. 2 is a diagram for explaining an adjustment value, which is added to or subtracted from the thermal displacement correction amount, being changed in real time;

DETAILED DESCRIPTION OF THE PREFERRED EMBODIMENTS

Hereafter, embodiments of the present invention are described with the drawings.

Figure 1A:
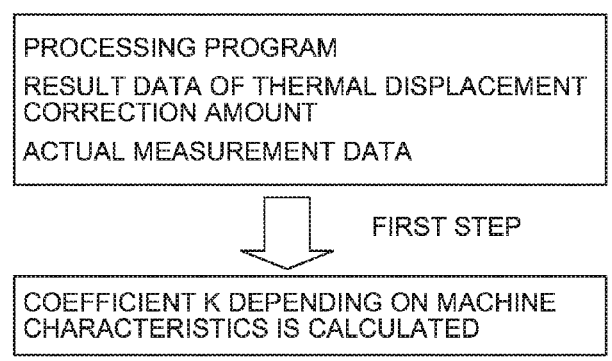
FIG. 1A is a diagram for explaining a first step of the present invention.
Figure 1B:
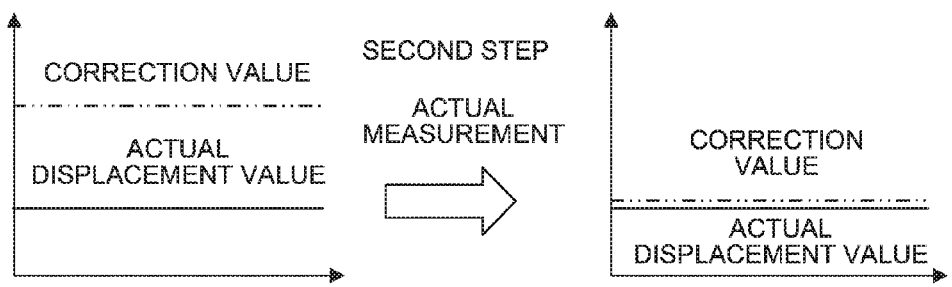
FIG. 1B is a diagram for explaining a second step of the present invention.
Figure 3:
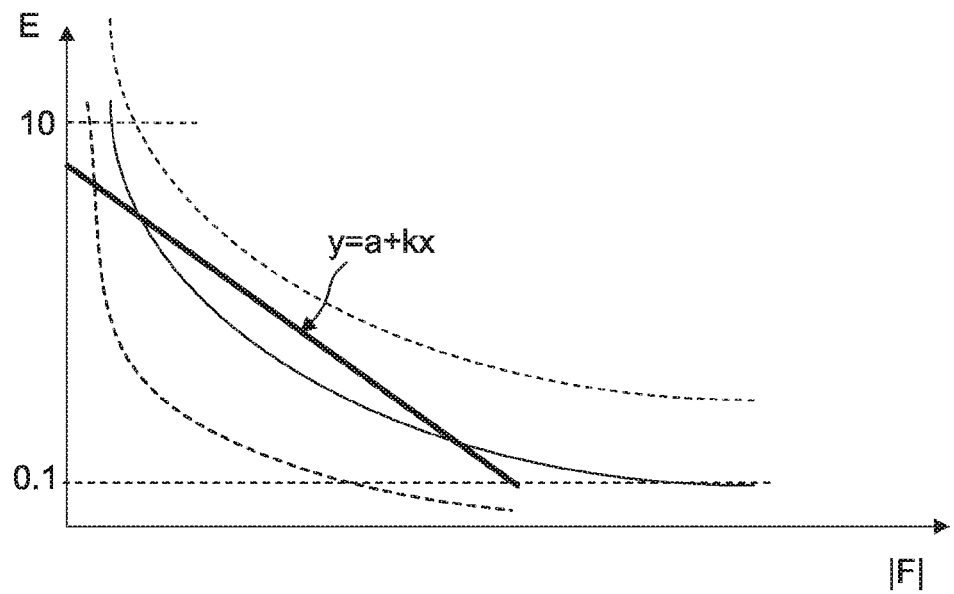
FIG. 3 is a diagram for explaining a principle of the present invention.

FIG. 1A and FIG. 1B are diagrams for explaining the present invention. FIG. 2 is a diagram for explaining an adjustment value, which is added to or subtracted from a thermal displacement correction amount, being changed in real time in the present invention. FIG. 3 is a diagram for explaining the principle of the present invention.

(1) Since the first step depends on the specifications of the machine (the structure of the machine, the control unit thereof, and the like), the step only has to be performed once in principle as long as the specifications of the machine are not changed. Accordingly, when a manufacturer of the machine tool preliminarily performs the first step to determine and store its conversion coefficient k in a memory, a user does not need to perform the step. Describing a processing program, a program that covers a range within which a thermal displacement amount of the machine can possibly arise is selected. In other words, the processing program is selected with which the thermal displacement amount in each operation direction of the machine arises to the maximum extent and to the minimum extent in the state where the thermal displacement amount is stable after the processing program is operated from the state where the thermal displacement does not arise in the machine.

(2) When a processing environment (processing situation) is changed, the second step is needed to cause at least one time performance of measurement. After that, the adjustment value is being changed in real time and reflected on correction of the thermal displacement amount. Actual measurement is performed when the difference between a correction value (value having the thermal displacement correction amount multiplied by the adjustment value) and an actual displacement value becomes large. The adjustment value is changed through the actual measurement, and thereby, the correction value is corrected.

According to the present invention, with the function which is included in a control apparatus of the machine tool and in which the thermal displacement amount is predicted and the thermal displacement correction is performed, the relation between the thermal displacement correction amount and the actual thermal displacement amount can be comprehended to obtain the appropriate adjustment value at all times in less measurement times.

There are relations in expression 1 and expression 2 between the thermal displacement correction amount F, the actual thermal displacement amount D and the adjustment value E, which are obtained from selection and actual operation of a plurality of processing programs. Notably, expression 2 is a variation of expression 1. Notably, as to the thermal displacement correction amount F and the actual thermal displacement amount D, the thermal displacement correction amount F and the actual thermal displacement amount D can take positive or negative values on the way of determining a position used as the reference in measuring these amounts.

$$E \cdot F = D \quad \text{(expression 1)}$$

$$E = D/F \ (F \text{ is not } 0; D \text{ and } F \text{ have the same signs}) \quad \text{(expression 2)}$$

Herein, assumptions are made as follows.

Assumption 1)

The actual thermal displacement amount D is a constant, and in other words, the aforementioned function is displayed as a graph in the above figure. The actual thermal displacement amount D is constant for a short period of time.

Assumption 2)

The calculation range of the adjustment value E is (Emin to Emax), and a typical adjustment coefficient takes Emin=0.01 and is presumed to take Emax=10 as its limit.

Within the aforementioned calculation range of the adjustment value E, the approximate function $$y = a + kx \quad \text{(expression 3)}$$

is obtained in the least-squares method. In other words, $$E = a + k|F| \quad \text{(expression 4)}$$

is obtained.

Furthermore, even when the thermal displacement amount D changes (in the case where the curve and curvature of the broken line change), the value of k in the aforementioned approximate function does not much change. Due to this, in processing, the value of k is typically almost constant with respect to both the maximum value and the minimum value of the actual thermal displacement amount D. Notably, a is a numerical value specified depending on the processing program.

Figure 4:
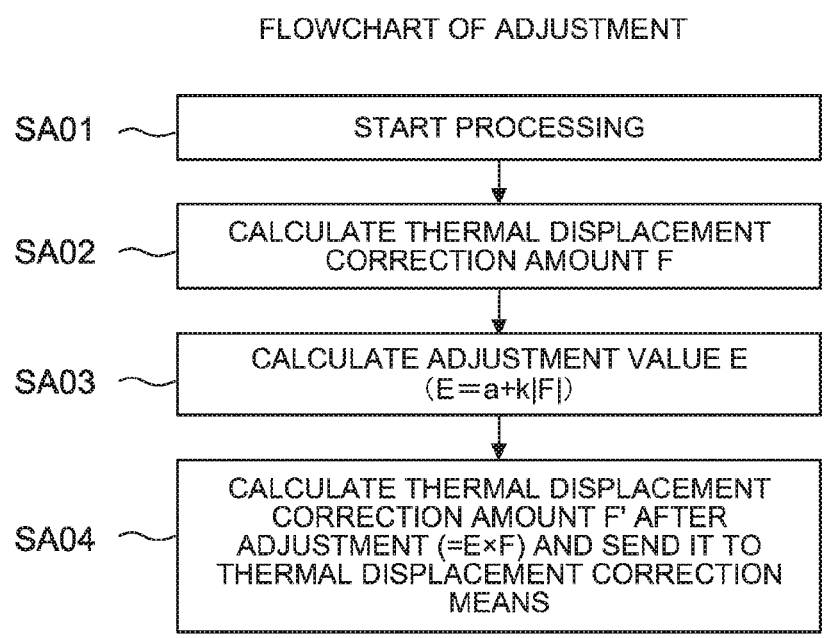
FIG. 4 is an overall flowchart of a process according to the present invention.

FIG. 4 is an overall flowchart according to the present invention.

First, a first step mentioned later is performed to determine the coefficient k in E=a+k|F| (expression 4). Since the coefficient k depends on the specifications of the machine (the structure of the machine, the control unit thereof, and the like), the first step only has to be performed once in principle as long as the specifications of the machine are not changed. Accordingly, when a manufacturer of the machine tool preliminarily performs the first step to determine and store the coefficient k in a memory of the numerical control apparatus that controls the machine tool, a user does not need to perform the step.

Next, when the coefficient a is not configured for actual processing, a second step mentioned later is performed to configure the coefficient a. The coefficient a is not needed to be recalculated with respect to the same processing program.

After the coefficients k and a are predetermined, adjustment of the thermal displacement correction is performed according to the following procedure.

Hereafter, a description is made step-by-step.

(Step SA01)

Thermal displacement correction means is set to be effective to start operation of the processing program. Notably, as the thermal displacement correction means, conventionally known means can be used.

(Step SA02)

The thermal displacement correction amount F is calculated. As a method for calculating the thermal displacement correction amount F, a conventionally known method can be used.

(Step SA03)

The adjustment value E is calculated with $E=a+k|F|$ (expression 4).

(Step SA04)

A thermal displacement correction amount after adjustment $F'=E\times F$ (expression 5) is calculated and sent to the thermal displacement correction means.

Figure 5:
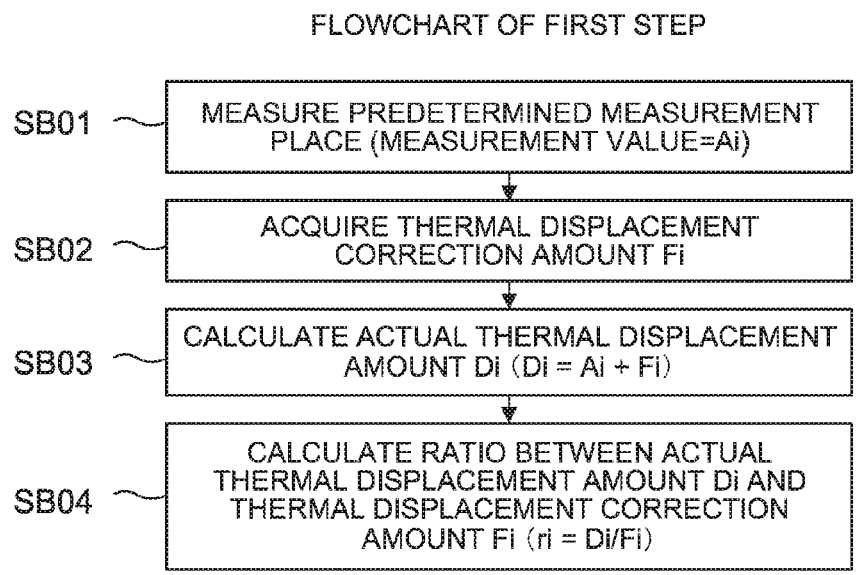
FIG. 5 is a flowchart of the first step.

FIG. 5 is a flowchart of the first step.

Processing programs are preliminarily prepared, and the conversion coefficient k is obtained for each processing program in the following procedure. Notably, the following procedure is performed after the thermal displacement correction means is set to be effective and operation of the processing program is started from the state where thermal displacement does not arise (the state of being sufficiently left in the stopped state). As the thermal displacement correction means, known one can be used. Moreover, the number of times and the time interval of performance of the following procedure are predetermined.

Hereafter, a description is made step-by-step.

(Step SB01)

An actual displacement value of a measurement place predetermined in the machine is measured and the result (measurement value) is stored as Ai (i denotes the iteration number (i=1, 2, 3, . . . ); the same holds true for the below). The measurement method may be any method. As mentioned above, Ai is a value measured in the state where the thermal displacement correction means is turned ON.

(Step SB02)

The thermal displacement correction amount is stored as Fi.

(Step SB03)

The actual thermal displacement amount Di is calculated from the measurement value Ai which is actually measured and the thermal displacement correction amount Fi (Di=Ai+Fi). To describe strictly, the actual thermal displacement amount Di corresponds to a thermal displacement amount in the occasion when the correction function is turned OFF.

(Step SB04)

The ratio between the actual thermal displacement amount Di and the thermal displacement correction amount Fi is calculated (ri=Di/Fi). It should be noted that the process is skipped when Fi=0.

After the aforementioned processes are performed in a predetermined number of times, the function $y=a+kx$ is obtained from the ratios ri and the thermal displacement correction amounts Fi in the least-squares method. In this stage, it is desirable that data in which ri<0 are excluded. The aforementioned processes are performed similarly for the other processing programs to obtain the functions $y=a+kx$. The average value of the coefficients k in the functions $y=a+kx$ thus obtained is calculated, and is newly set to be k. To obtain the coefficient a, the actual thermal displacement amount is measured at the predetermined measurement place in operating the processing program. Notably, when the coefficient a has been already obtained for the same processing program in the same processing environment, the second step is not needed to be performed.

Herein, more specific description is made using two processing programs O0001 and O0002. It is supposed that the cycle time of each processing program is approximately 30 minutes.

1. The processing program O0001 is operated from the state where the machine is stopped. The thermal displacement correction function is turned ON and the measurement is performed every minute.

2. The measurement results A1 to A30 are acquired through the measurement and the thermal displacement correction values F1 to F30 are acquired through the correction function. D1 to D30 are calculated with Di=Ai+Fi.

3. With ri=Di/Fi, r1 to r30 are calculated. The plot of r1 to r30 and |F1| to |F30| is created. Data in which ri<0 are excluded.

4. In the least-squares method, $y=a+k1\cdot x$ is obtained from the aforementioned plot.

5. The machine is stopped.

6. The processing program O0002 is operated from the state where the machine is stopped, and the procedure of step 1 to step 4 is performed to obtain $y=a+k2\cdot x$.

7. The coefficient k of this machine is configured to be $k=(k1+k2)/2$. The value k is the average value of the coefficients obtained by performing the respective processing programs.

Figure 6:
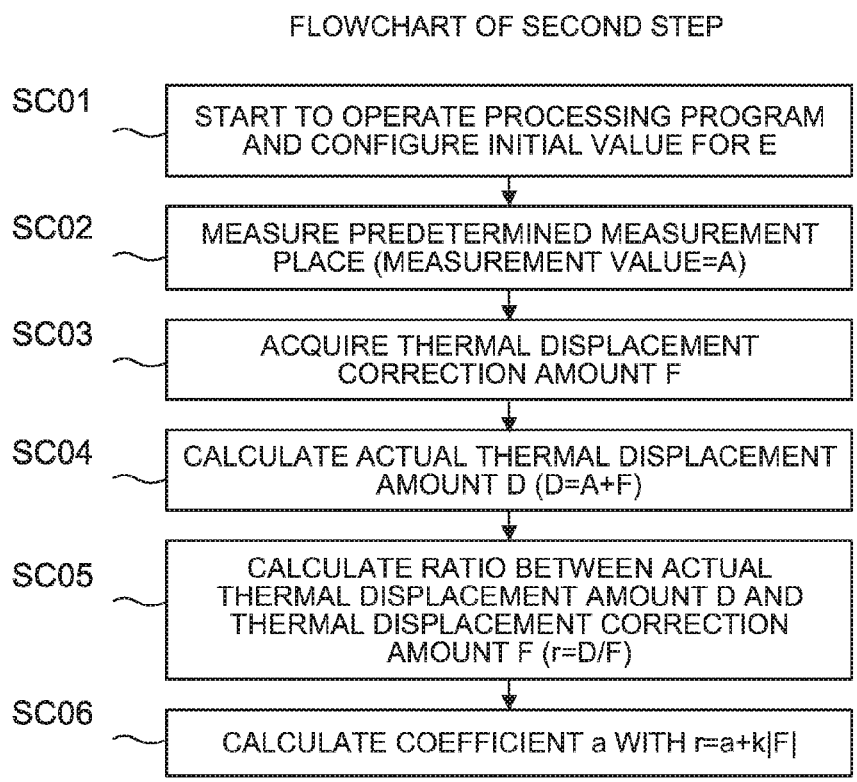
FIG. 6 is a flowchart of the second step.

FIG. 6 is a flowchart of the second step.

(Step SC01)

Operation of the processing program is started and the adjustment value E of the machine is preset. As this adjustment value, a value appropriate for the processing program is selected. When such an appropriate value is not clear, it is configured as E=1.

(Step SC02)

Measurement is performed at the predetermined measurement place and the result (measurement value) is stored as A. The measurement method may be any method.

(Step SC03)

The thermal displacement correction amount is stored as F.

(Step SC04)

The actual thermal displacement amount D is calculated from the measurement value A which is actually measured and the thermal displacement correction amount F (D=A+F).

(Step SC05)

The ratio between the actual thermal displacement amount D and the thermal displacement correction amount F is calculated (r=D/F).

It should be noted that r=E when F=0. E is the adjustment value of existing thermal displacement at this measurement time.

(Step SC06)

The coefficient a is calculated with $r=a+k|F|$ (k is the coefficient calculated in the aforementioned first step).

The coefficient a thus calculated is stored in association with the processing program.

Figure 7:
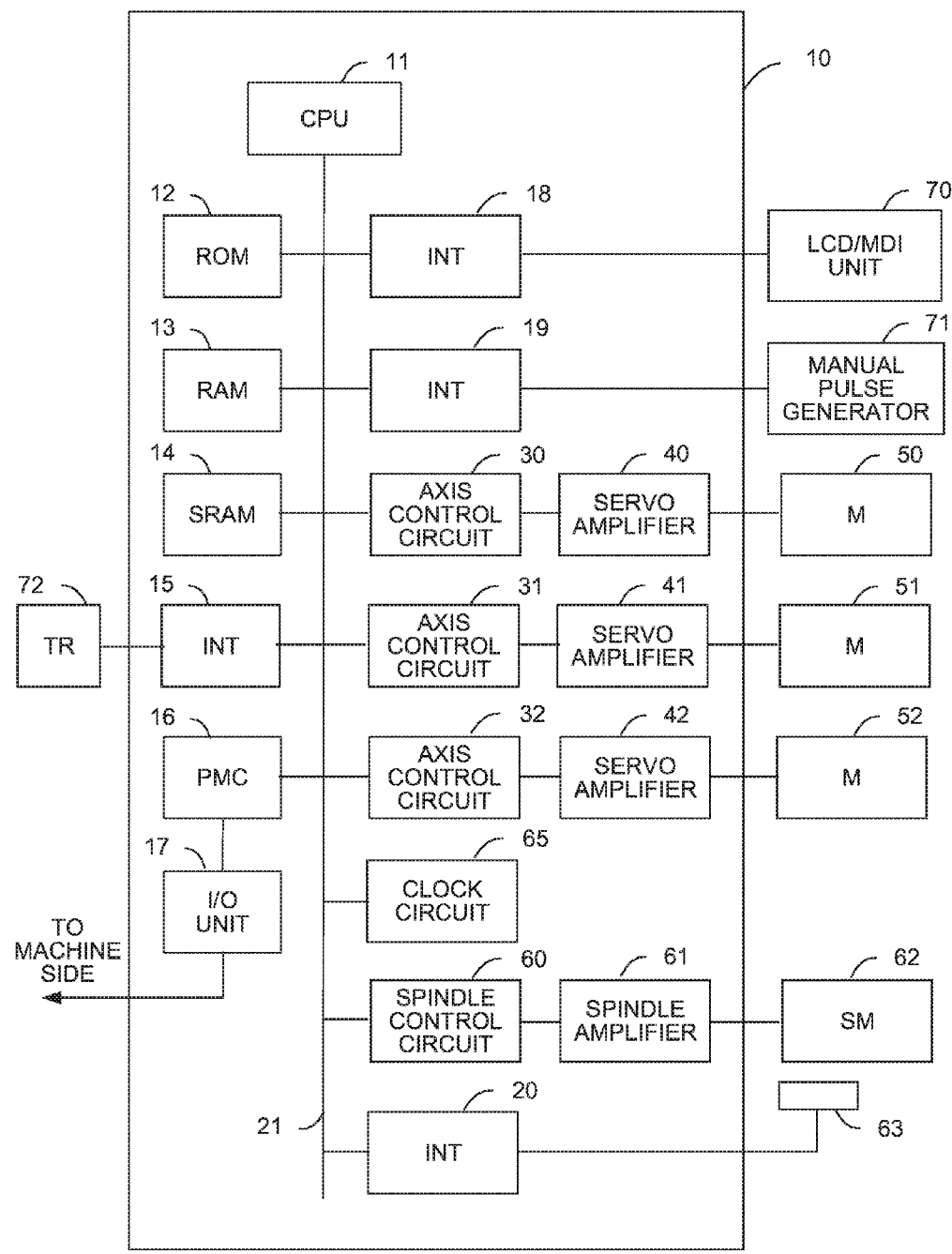
FIG. 7 is a block diagram for explaining an overview of a numerical control apparatus that controls a machine tool.

FIG. 7 is a block diagram for explaining an overview of a numerical control apparatus that controls a machine tool. A thermal displacement correction apparatus for a machine tool according to the present invention is constituted of a numerical control apparatus 10 that controls the machine tool. A processor (CPU) 11 of the numerical control apparatus 10 is a processor that totally controls the numerical control apparatus 10. The processor 11 reads out a system program stored in a ROM 12 via a bus 21 and totally controls the numerical control apparatus 10 according to the system program. An LCD/MDI unit 70 is a manual input apparatus equipped with a display device. Notably, the LCD means a liquid crystal display. In a RAM 13, temporary calculation data and display data, various kinds of data inputted by an operator via the LCD/MDI unit 70, and the like are stored.

An SRAM 14 is backed up by a not-shown battery, is configured as a non-volatile memory in which the storage state is held even when the power supply of the numerical control apparatus 10 is turned off, and stores a program for measuring the initial position, a program for performing thermal displacement correction of the machine tool, processing programs which are read via an interface 15 and mentioned later, processing programs inputted via the LCD/MDI unit 70, and the like. Moreover, in the ROM 12, various system programs for performing a process of an edit mode needed for creating and editing the processing programs and a process for automatic operation are written beforehand.

The interface 15 is an interface for an external device connectable to the numerical control apparatus 10, and thereto, an external device 72 such as an external storage apparatus is connected. From the external storage apparatus, the processing programs, a thermal displacement measurement program and the like are read. A programmable machine controller (PMC) 16 controls an auxiliary apparatus and the like on the machine tool side with sequence programs implemented in the numerical control apparatus 10. That is, signals needed on the auxiliary apparatus side are converted with these sequence programs and outputted to the auxiliary apparatus side from an I/O unit 17 according to the M function, S function and T function instructed by the processing program. The auxiliary apparatus including various actuators and the like is actuated according to the output signals. Moreover, signals from various switches and the like on an operation panel installed in the main body of the machine tool are received, are subject to necessary processes, and are handed over to the processor 11.

Image signals for current positions of the axes of the machine tool, alarming, parameters, image data and the like are sent to the LCD/MDI unit 70 and displayed on its display. The LCD/MDI unit 70 is a manual data input apparatus including a display, a keyboard and the like. From the keyboard of the LCD/MDI unit 70, an interface 18 receives data, which is handed over to the processor 11.

An interface 19 is connected to a manual pulse generator 71. The manual pulse generator 71 is implemented on an operation panel of the machine tool and used for precisely positioning movable units of the machine tool through control of the axes with a distribution pulse based on manual operation. Axis control circuits 30 and 31 for the X- and Y-axes and a control circuit 32 for the Z-axis with which a table T of the machine tool is moved receive motion commands for the axes from the processor 11, and output the commands for the axes to servo amplifiers 40 to 42. The servo amplifiers 40 to 42 receive the commands and drive servomotors 50 to 52 of the axes of the machine tool. In the servomotors 50 to 52 of the axes, pulse coders for position detection are implemented, and position signals from the pulse coders are fed back as a pulse sequence.

A spindle control circuit 60 receives a main spindle rotation command to the machine tool and outputs a spindle speed signal to a spindle amplifier 61. The spindle amplifier 61 receives the spindle speed signal and causes a main spindle motor 62 of the machine tool to rotate at the instructed rotational speed and to drive a tool. A position coder 63 is coupled to the main spindle motor 62 through gears, a belt or the like. The position coder 63 outputs a feedback pulse in synchronization with the rotation of the main spindle, and the feedback pulse is read by the processor 11 via an interface 20. Reference numeral 65 denotes a clock apparatus which is adjusted to be synchronized with the current time.

The numerical control apparatus 10 has a thermal displacement correction unit, for example, disclosed in Japanese Patent Laid-Open No. 11-90779 or Japanese Patent Laid-Open No. 11-114775, which predicts the thermal displacement amount from the operation of the machine or the temperatures of the places of the machine and corrects the thermal displacement by adding, to the position command value of the feed axis, the thermal displacement correction amount for canceling the thermal displacement amount thus predicted. The thermal displacement correction unit is conventionally known as disclosed, for example, in Japanese Patent Laid-Open No. 11-90779 and Japanese Patent Laid-Open No. 11-114775, and hence, not described here in detail. The numerical control apparatus 10 includes measurement means disclosed in Patent Literature 1 (refer to chapter "0032" and FIG. 1) and can measure the actual position in the machine. The numerical control apparatus 10 further includes software for performing the processes in the flowcharts illustrated in FIG. 4, FIG. 5 and FIG. 6, and thereby, constitutes the thermal displacement correction apparatus of the present invention.

Hereafter, the thermal displacement correction apparatus which automatically determines necessity/unnecessity of actual measurement and is for a machine tool according to the present invention is described in accordance with each embodiment.

Embodiment 1

Figure 8:
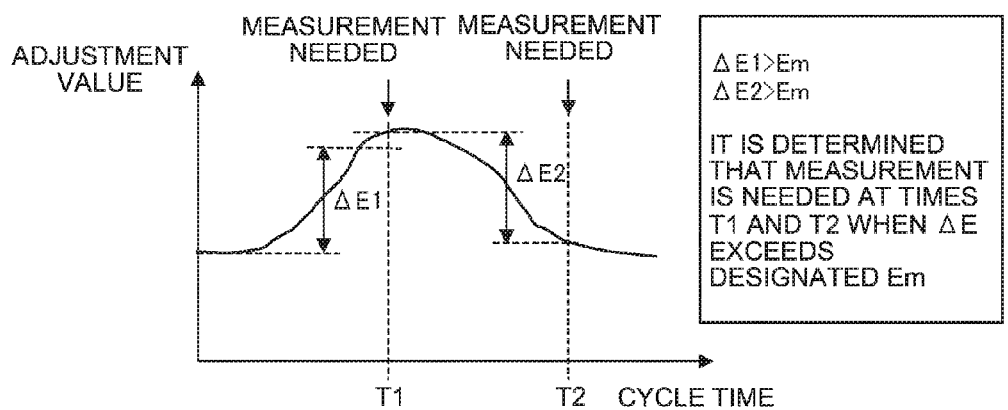
FIG. 8 is a diagram illustrating a first example of a criterion for determining whether or not actual measurement is performed.

FIG. 8 is a diagram illustrating a first example of a criterion for determining whether or not actual measurement is performed. A threshold of a change amount of the adjustment value that is designated beforehand is set to be Em. During the cycle time, a change amount $\Delta E$ of the adjustment value is obtained. $\Delta E$ is compared with Em, and when $\Delta E < Em$, actual measurement is not performed. When $\Delta E \geq Em$, actual measurement is performed.

Upon the start of processing, the adjustment value is changing with passage of time. It is indicated that actual measurement is needed when the change amount $\Delta E$ of the adjustment value exceeds the designated Em. As to the adjustment value, temperature measurement is performed when the adjustment value increases and decreases. In FIG. 8, the measurement is needed at the time points of T1 and T2.

Figure 9:
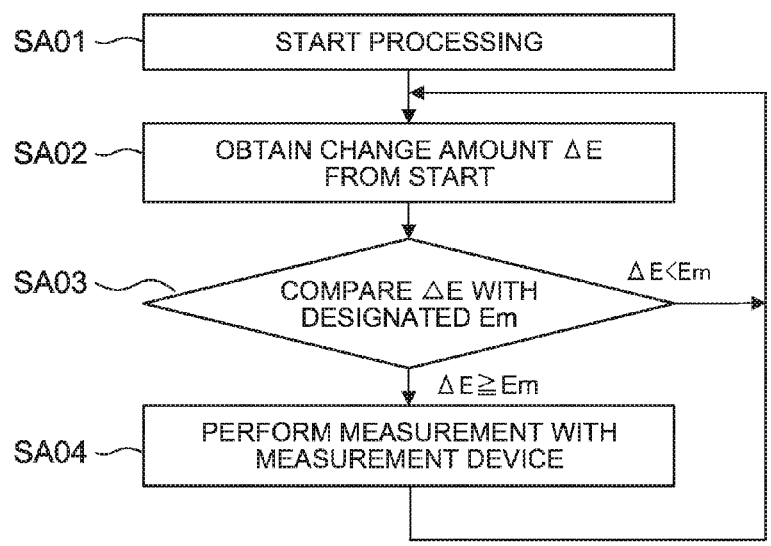
FIG. 9 is a diagram illustrating a flow of determination based on the criterion illustrated in FIG. 8.

FIG. 9 is a diagram illustrating a flow of determination based on the criterion illustrated in FIG. 8. Processing is started (SA01) and the change amount $\Delta E$ from the start of processing is obtained (SA02). $\Delta E$ is compared with the designated Em, and when $\Delta E < Em$, the process is returned to step SA02. When $\Delta E \geq Em$, the process is put forward to step SA04 (SA03). When $\Delta E \geq Em$, it is determined that actual measurement is needed (SA04). After the measurement is completed, the process is returned to SA02.

Embodiment 2

Figure 10:
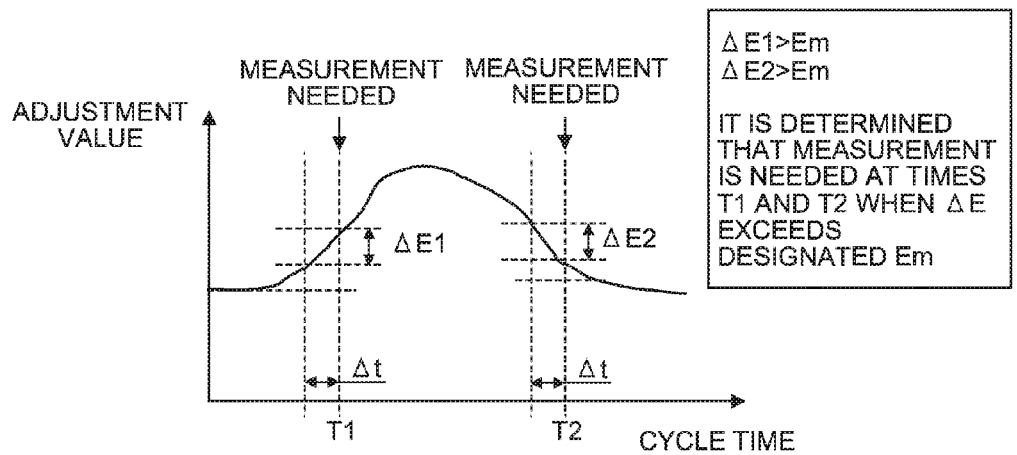
FIG. 10 is a diagram illustrating a second example of a criterion for determining whether or not actual measurement is performed.
Figure 11:
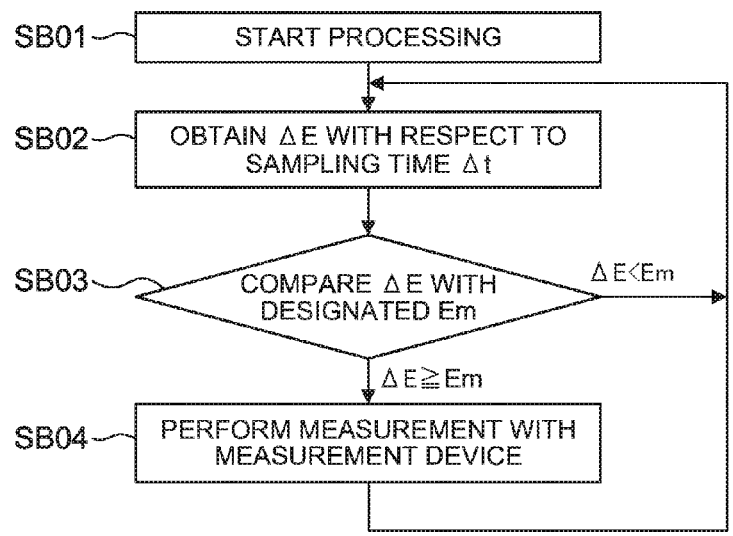
FIG. 11 is a diagram illustrating a flow of determination based on the criterion illustrated in FIG. 10.

FIG. 10 is a diagram illustrating a second example of a criterion for determining whether or not actual measurement is performed. FIG. 11 is a diagram illustrating a flow of determination based on the criterion illustrated in FIG. 10.

A threshold of a change amount of the adjustment value that is designated beforehand is set to be Em. During the cycle time, a difference ΔE between the maximum value and the minimum value of the adjustment value is obtained during every ΔT. ΔE is compared with Em, and when ΔE<Em, actual measurement is not performed. When ΔE≥Em, actual measurement is performed. In FIG. 10, the measurement is needed at the time points of T1 and T2.

FIG. 11 is a diagram illustrating a flow of determination based on the criterion illustrated in FIG. 10. Processing is performed (SB01) and ΔE with respect to the sampling time ΔT is obtained (SB02). ΔE is compared with the designated Em, and when ΔE<Em, the process is returned to step SB02. When ΔE≥Em, the process is put forward to step SB04 (SB03). When ΔE≥Em, it is determined that actual measurement is needed (SB04). After the measurement is completed, the process is returned to SB02.

Embodiment 3

Figure 12:
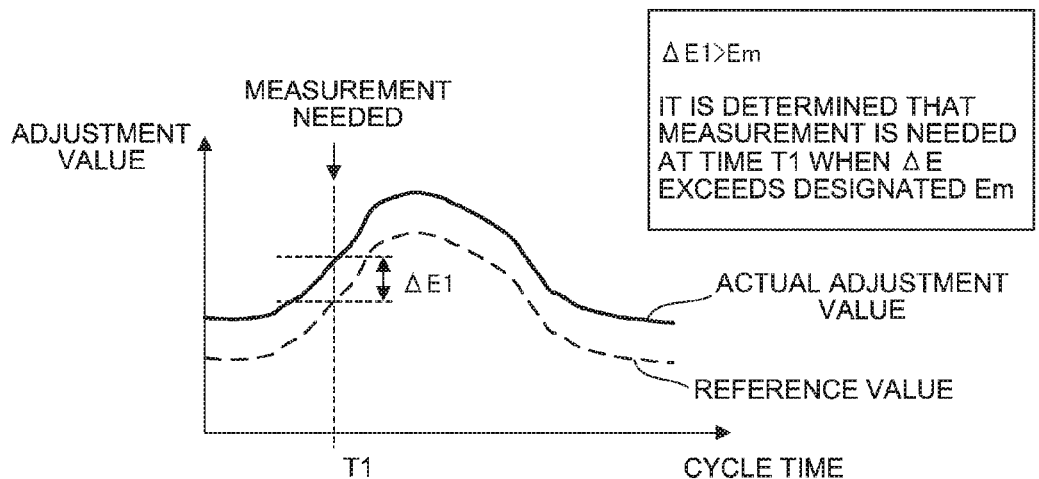
FIG. 12 is a diagram illustrating a third example of a criterion for determining whether or not actual measurement is performed.

FIG. 12 is a diagram illustrating a third example of a criterion for determining whether or not actual measurement is performed. With regard to a sampling time T1 designated beforehand, a numerical value Em designated beforehand, and a reference value stored beforehand, this reference value is an adjustment value with respect to the time unit of the cycle time in the case where user's processing requirements are satisfied. Moreover, the user determines a function of the sampling time and a setting of the reference value. During the cycle time, the adjustment value is compared with the data of the reference value at T1, and a difference ΔE therebetween is obtained. ΔE is compared with Em, and when ΔE<Em, actual measurement is not performed. When ΔE≥Em, actual measurement is performed.

Figure 13:
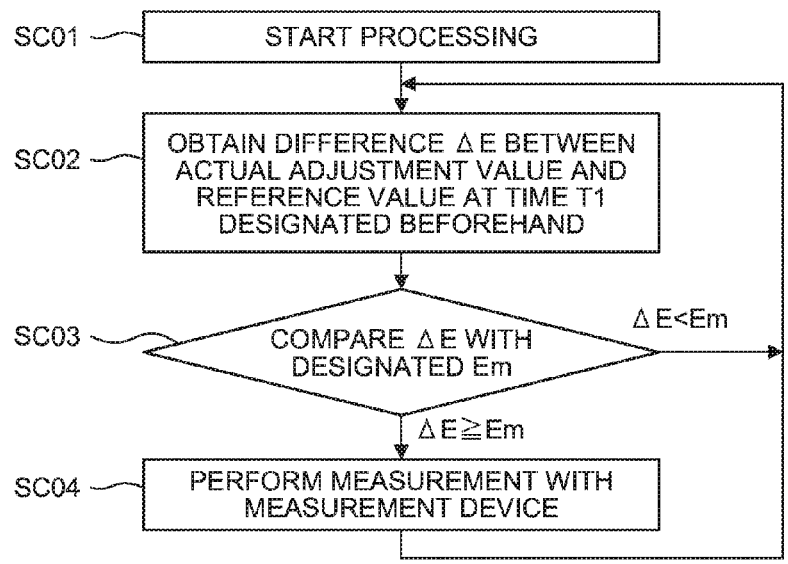
FIG. 13 is a diagram illustrating a flow of determination based on the criterion illustrated in FIG. 12.

FIG. 13 is a diagram illustrating a flow of determination based on the criterion illustrated in FIG. 12.

Processing is started and the functional processing of the present invention is started (SC01). At the time T1 designated beforehand, the difference ΔE between the actual adjustment value and the reference value is obtained (SC02). ΔE is compared with the Em designated beforehand. When ΔE<Em, the process is returned to step SC02, and when ΔE≥Em, the process is put forward to step SC04 (SC03). When ΔE≥Em, it is determined that measurement is needed, the measurement is performed with a measurement device, and after the measurement is completed, the process is returned to SC02.

The invention claimed is:

1. A thermal displacement correction apparatus for a machine tool comprising:
 a processor programmed to
   predict a thermal displacement amount from an operation of the machine tool or a temperature of each portion of the machine tool, and calculate a thermal displacement correction amount for correcting thermal displacement by adding, to a position command value of a feed axis of the machine tool, the thermal displacement correction amount for cancelling the thermal displacement amount thus predicted,
   calculate an adjustment value for adjusting the thermal displacement correction amount on the basis of the thermal displacement correction amount,
   determine, on the basis of a changing situation of the adjustment value, whether it is needed to perform, by a measurement unit, measurement of an actual dimension of a workpiece to be processed by the machine tool, wherein the processor is programmed to
   compare (1) a first value associated with the adjustment value which changes with time upon starting of processing by the machine tool with (2) a second value representing a threshold which is designated previously,
   in response to the first value not exceeding the second value, determine that the measurement of the actual dimension of the workpiece is not needed, and
   in response to the first value exceeding the second value, determine that the measurement of the actual dimension of the workpiece is needed, and
   in response to a determination that the measurement of the actual dimension of the workpiece is needed,
   control the measurement unit to perform the measurement of the actual dimension of the workpiece,
   calculate the thermal displacement correction amount based on the actual dimension of the workpiece obtained by the measurement, and
   control the feed axis of the machine tool by the position command value corrected by the thermal displacement correction amount calculated based on the actual dimension of the workpiece, wherein the adjustment value is changed, through the actual measurement, in real time and reflected on correction of the thermal displacement.

2. The thermal displacement correction apparatus according to claim 1, wherein the processor is further programmed to determine that the measurement of the actual dimension of the workpiece is needed when a difference between a maximum of the adjustment value and a minimum of the adjustment value within a predetermined sample time at a designated time interval exceeds a standard value.

3. The thermal displacement correction apparatus according to claim 1, wherein the processor is further programmed to
 store a reference value in the machine tool beforehand, and
 determine that the measurement is needed when a difference between the adjustment value at a designated time and the preset reference value exceeds a standard value.

4. A numerical control apparatus for controlling a machine tool, the numerical control apparatus comprising:
 the thermal displacement correction apparatus according to claim 1; and
 an axis controller configured to
   output the position command value corrected by the thermal displacement correction amount adjusted by the processor of the thermal displacement correction apparatus, and
   control a servomotor of the feed axis of the machine tool by the corrected position command value.

5. The thermal displacement correction apparatus according to claim 1, wherein
 the processor is programmed to calculate the adjustment value using the following expression $$E = a + k|F|$$

where E is the adjustment value,
 k is a conversion coefficient depending on a specification of the machine tool,
 F is the thermal displacement correction amount, and
 a is a coefficient calculated from r=a+k|F|, where r is a ratio between an actual thermal displacement amount D and the thermal displacement correction amount F.

* * * * *